(12) United States Patent
Kang

(10) Patent No.: US 11,358,491 B2
(45) Date of Patent: Jun. 14, 2022

(54) VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventor: Seung Won Kang, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 391 days.

(21) Appl. No.: 16/553,397

(22) Filed: Aug. 28, 2019

(65) Prior Publication Data

US 2020/0180468 A1   Jun. 11, 2020

(30) Foreign Application Priority Data

Dec. 10, 2018  (KR) .................. 10-2018-0158579

(51) Int. Cl.
    *B60L 58/13*   (2019.01)
    *H02J 7/00*   (2006.01)
    *B60L 50/61*   (2019.01)
    *B60R 16/033*   (2006.01)
    *B60L 1/00*   (2006.01)
    *F02N 11/08*   (2006.01)

(52) U.S. Cl.
    CPC .............. *B60L 58/13* (2019.02); *B60L 1/00* (2013.01); *B60L 50/61* (2019.02); *B60R 16/033* (2013.01); *F02N 11/0825* (2013.01); *H02J 7/007* (2013.01); *F02N 2200/061* (2013.01); *F02N 2300/2008* (2013.01)

(58) Field of Classification Search
    CPC .. B60L 58/13; B60L 50/61; B60L 1/00; B60R 16/033; F02N 11/0825; F02N 11/08; F02N 2200/061; F02N 2300/2008; H02J 7/007
    USPC .......................................... 320/109
    See application file for complete search history.

(56) References Cited

U.S. PATENT DOCUMENTS

| | | | |
|---|---|---|---|
| 2007/0262750 A1* | 11/2007 | Yun ...................... | H01M 10/486 320/132 |
| 2010/0085009 A1* | 4/2010 | Kang ..................... | H02J 7/0019 320/118 |
| 2011/0161025 A1* | 6/2011 | Tomura ................... | G16Z 99/00 702/63 |

(Continued)

*Primary Examiner* — Richard Isla
*Assistant Examiner* — Dung V Bui
(74) *Attorney, Agent, or Firm* — McDonnell Boehnen Hulbert & Berghoff LLP

(57) ABSTRACT

Disclosed is a vehicle capable of efficiently managing a battery. The vehicle includes the battery, a battery sensor configured to sense an output voltage and an output current of the battery, and a power management device configured to control charging of the battery based on a state of charge (SoC) of the battery. The power management device may calculate an estimated SoC of the battery based on the output current of the battery, calculate an actual SoC based on the output of a battery model corresponding to an input of the output voltage and the output current, and based on an error between the actual SoC and the estimated SoC, activate a power generation control, which controls a generator based on the SoC of the battery, and an idle stop & go (ISG), which turns off an engine during stopping of the vehicle.

18 Claims, 13 Drawing Sheets

(56) References Cited

U.S. PATENT DOCUMENTS

| | | | |
|---|---|---|---|
| 2013/0335030 A1* | 12/2013 | Joe | H01M 10/052 |
| | | | 320/134 |
| 2017/0028867 A1* | 2/2017 | Ishishita | H02J 7/00712 |
| 2017/0145977 A1* | 5/2017 | Toyama | B60L 15/20 |

* cited by examiner

FIG. 6

| SOC(%) | | CURRENT(A) | | |
|---|---|---|---|---|
| | | -40 | -30 | -20 |
| VOLTAGE(V) | $V1_{40/30/20A}$ | 40% | 35% | 32% |
| | $V2_{40/30/20A}$ | 50% | 40% | 37% |
| | $V3_{40/30/20A}$ | 60% | 50% | 40% |

FIG. 9

| Case | | POWER GENERATION CONTROL | ISG | SOC Range RESETTING | REMARKS |
|---|---|---|---|---|---|
| 1 | $SOC_{Charge\ 1\ Error} \leq \beta\%$ | ○ | ○ | × | NON AGING |
| 2 | $SOC_{Charge\ 1\ Error} \leq (SOC_{Chage1} \times SOC_{Reset3\ Error\ Ratio})$ | ○ | ○ | ○ | AGING |
| 3 | $SOC_{Charge\ 1\ Error} > (SOC_{Chage1} \times SOC_{Reset3\ Error\ Ratio})$ $SOC_{Charge\ 1\ Error} \leq \beta\%$ | × | ○ | ○ | AGING |
| 4 | $\alpha\% < SOC_{Reset1\ Error} < SOC_{Charge\ 1\ Error}$ | × | × | × | AGING |

VEHICLE AND METHOD FOR CONTROLLING THE SAME

CROSS-REFERENCE TO RELATED APPLICATION(S)

This application is based on and claims priority under 35 U.S.C. § 119 to Korean Patent Application No. 10-2018-0158579, filed on Dec. 10, 2018 in the Korean Intellectual Property Office, the disclosure of which is incorporated herein by reference.

BACKGROUND

1. Technical Field

The present disclosure relates to a vehicle and a method for controlling the same, and more specifically, to a vehicle capable of efficiently managing a battery, and a method for controlling the same.

2. Description of the Related Art

Generally, a vehicle refers to a movement apparatus or a transportation apparatus, designed to run on a road or railway using fossil fuels, electric power, and the like as a power source.

The vehicle is equipped with various electronic components to protect a driver and provide the driver with convenience and fun. For example, the vehicle is equipped with electronic components such as power steering and seat heating that consume a large amount of power.

As a result, consumption of electrical energy of a battery, which supplies power to a starter motor, is increased, and it causes a problem in that the starter motor is not started or the life of the battery is shortened.

Specifically, lead-acid batteries have been widely used in the past as the battery for the vehicle, and lithium ion batteries have been recently used as the battery for the vehicle.

A technique for the lead-acid batteries have been developed to efficiently manage a state of charge (SoC) of the battery, but a technique for the lithium ion batteries lack the technology to efficiently manage the SoC of the battery.

SUMMARY

Therefore, it is an object of the present disclosure to provide a vehicle capable of efficiently managing a battery, and a method for controlling the same.

It is another object of the present disclosure to provide a vehicle capable of improving the life of a lithium ion battery, and a method for controlling the same.

Additional aspects of the disclosure will be set forth in part in the description which follows and, in part, will be obvious from the description, or may be learned by practice of the disclosure.

In accordance with an aspect of the present disclosure, a vehicle includes a battery, a battery sensor configured to sense an output voltage and an output current of the battery, and a power management device configured to control charging of the battery based on a state of charge (SoC) of the battery. The power management device may calculate an estimated SoC of the battery based on the output current of the battery, calculate an actual SoC based on the output of a battery model corresponding to an input of the output voltage and the output current, and based on an error between the actual SoC and the estimated SoC, activate a power generation control, which controls a generator based on the SoC of the battery, and an idle stop & go (ISG), which turns off an engine during stopping of the vehicle.

The power management device may input the output voltage and the output current to the battery model when the estimated SoC of the battery is out of an available range of the battery and calculate a first reference SoC based on an output of the battery model, reset the estimated SoC of the battery to the first reference SoC, and calculate a first calculation error based on a difference between the first reference SoC and the estimated SoC.

The power management device may calculate a first increment of the estimated SoC of the battery while charging the battery, define the SoC, which is determined when the output voltage of the battery reaches a target voltage and the output current of the battery decreases, as a second reference SoC, and calculate a second calculation error based on a difference between a value, which is a difference between the second reference SoC and the first reference SoC, and a second increment of the estimated SoC.

The power management device may calculate the second increment of the estimated SoC of the battery while charging the battery, define the SoC, which is determined when the output voltage of the battery is higher than the target voltage and the output current of the battery is lower than a reference current, as a third reference SoC, and calculate a third calculation error based on a difference between a value, which is a difference between the third reference SoC and the second reference SoC, and a third increment of the estimated SoC.

The power management device may activate the power generation control and the ISG when the second calculation error is smaller than a predetermined first reference error.

The power management device may, when the second calculation error is greater than or equal to a predetermined first reference error, determine whether both the second calculation error and the first calculation error are greater than a second reference error. The second reference error may be greater than the first reference error.

The power management device may, when both the second calculation error and the first calculation error are greater than the second reference error, deactivate the power generation control and the ISG.

The power management device may, when the second calculation error is equal to or greater than a predetermined first reference error, calculate a third calculation error rate based on a quotient of the third calculation error divided by a difference between the third reference SoC and the second reference SoC.

The power management device may, when the second calculation error is larger than the product of the first increment of the estimated SoC and the third calculation error rate, deactivate the power generation control and activate the ISG.

The power management device may, when the second calculation error is less than or equal to the product of the first increment of the estimated SoC and the third calculation error rate, activate the power generation control and the ISG.

In accordance with an aspect of the present disclosure, a method for controlling a vehicle which comprises a battery and a battery sensor to sense an output voltage and an output current of the battery includes calculating an estimated SoC of the battery based on the output current of the battery, calculating an actual SoC based on the output of a battery model corresponding to an input of the output voltage and the output current, and based on an error between the actual SoC and the estimated SoC, activating a power generation control, which controls a generator based on a SoC of the battery, and an idle stop & go (ISG), which turns off an engine during stopping of the vehicle The activating of the power generation control and the ISG may include inputting the output voltage and the output current to the battery model when the estimated SoC of the battery is out of an available range of the battery and calculating a first reference SoC based on an output of the battery model, resetting the estimated SoC of the battery to the first reference SoC, and calculating a first calculation error based on a difference between the first reference SoC and the estimated SoC.

The activating of the power generation control and the ISG may include calculating a first increment of the estimated SoC of the battery while charging the battery, defining the SoC, which is determined when the output voltage of the battery reaches a target voltage and the output current of the battery decreases, as a second reference SoC, and calculating a second calculation error based on a difference between a value, which is a difference between the second reference SoC and the first reference SoC, and a second increment of the estimated SoC.

The activating of the power generation control and the ISG may include calculating the second increment of the estimated SoC of the battery while charging the battery, defining the SoC, which is determined when the output voltage of the battery is higher than the target voltage and the output current of the battery is lower than a reference current, as a third reference SoC, and calculating a third calculation error based on a difference between a value, which is a difference between the third reference SoC and the second reference SoC, and a third increment of the estimated SoC.

The activating of the power generation control and the ISG may include activating the power generation control and the ISG when the second calculation error is smaller than a predetermined first reference error.

The activating of the power generation control and the ISG may include, when the second calculation error is greater than or equal to a predetermined first reference error, determining whether both the second calculation error and the first calculation error are greater than a second reference error. The second reference error may be greater than the first reference error.

The activating of the power generation control and the ISG may include, when both the second calculation error and the first calculation error are greater than the second reference error, deactivating the power generation control and the ISG.

The activating of the power generation control and the ISG may include, when the second calculation error is equal to or greater than a predetermined first reference error, calculating a third calculation error rate based on a quotient of the third calculation error divided by a difference between the third reference SoC and the second reference SoC.

The activating of the power generation control and the ISG may include, when the second calculation error is larger than the product of the first increment of the estimated SoC and the third calculation error rate, deactivating the power generation control and activating the ISG.

The activating of the power generation control and the ISG may include, when the second calculation error is less than or equal to the product of the first increment of the estimated SoC and the third calculation error rate, activating the power generation control and the ISG.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 illustrates a method of calculating a first reference SoC of a battery according to an embodiment;

FIG. 9 is a view illustrating an example of how a power management device according to one embodiment activates or deactivates power generation control and/or idle stop & go control.

DETAILED DESCRIPTION

Figure 1:
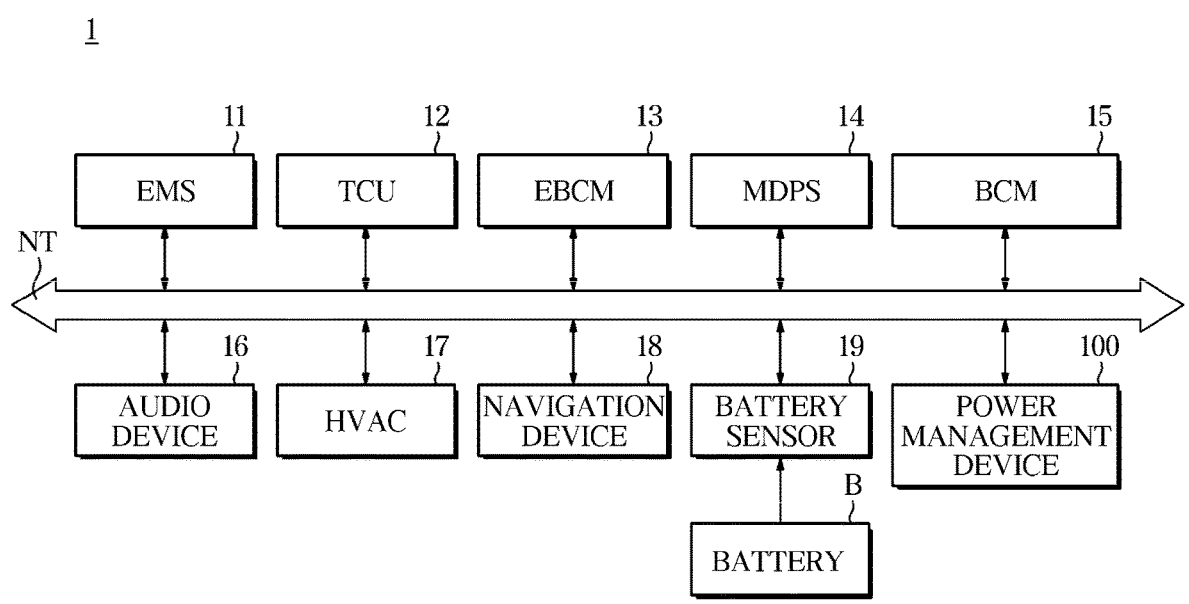
FIG. 1 is a view illustrating an electrical configuration of a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting. As used herein, the singular forms "a," "an," and "the" are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c" should be understood as including only a, only b, only c, both a and b, both a and c, both b and c, or all of a, b, and c.

Hereinafter, the operating principles and embodiments of the disclosed will be described with reference to the accompanying drawings.

FIG. 1 is a view illustrating an electrical configuration of a vehicle according to an embodiment.

A vehicle 1 includes a body that forms an appearance thereof and accommodates a driver and/or baggage, a chassis including components of the vehicle 1 other than the body, and electronic components that protect the driver and provide comfort to the driver.

For example, the electronic components may include an Engine Management System (EMS) 11, a Transmission Control Unit (TCU) 12, an Electronic Brake Control Module (EBCM) 13, Motor-Driven Power Steering (MDPS) 14, a body control module (BCM) 15, an audio device 16, a heating/ventilation/air conditioning (HVAC) 17, a navigation device 18, a battery sensor 19, and a power management device 100. Also, a battery B for supplying electric power to the electronic components may be provided.

The EMS 11 may control an operation of an engine and manage the engine in response to the driver's acceleration command through an accelerator pedal. For example, the EMS 11 may perform engine torque control, fuel consumption control, engine failure diagnosis, and/or alternator control.

The TCU 12 may control an operation of a transmission in response to a shift command of the driver through a shift lever or a traveling speed of the vehicle 1. For example, the TCU 12 may perform clutch control, shift control, and/or engine torque control during shifting.

The EBCM 13 may control a braking device of the vehicle 1 and maintain balance of the vehicle 1 in response to the driver's braking command through a brake pedal. For example, the EBCM 13 may perform an automatic parking brake, slip prevention during braking, and/or slip prevention during steering.

The MDPS 14 may assist the driver in operating a steering wheel so that the driver can easily operate the steering wheel. For example, the MDPS 14 may assist in a steering operation of the driver, such as reducing a steering force during low-speed driving or parking and increasing the steering force during high-speed driving.

The BCM 15 may control operations of electronic components that provide comfort to the driver or ensure the safety of the driver. For example, the BCM 15 may control a door lock device, a head lamp, a wiper, a power seat, a seat heater, a cluster, a room lamp, and a multifunctional switch installed in the vehicle 1.

The audio device 16 may provide various information and entertainment to the driver through sound. For example, the audio device 16 may reproduce an audio file stored in an internal storage medium or an external storage medium according to a command from the driver, and output audio included in the reproduced audio file. In addition, the audio device 16 may receive an audio broadcast signal and output audio corresponding to the received audio broadcast signal.

The HVAC 17 may introduce air from outside the vehicle 1 into the interior of the vehicle 1 or circulate air inside the vehicle 1. In addition, the HVAC 17 may heat or cool the interior air according to an interior temperature of the vehicle 1.

The navigation device 18 may receive a destination from the driver, searches for a route to the destination input by the driver, and display the route. In addition, the navigation device 18 may output music or images according to the input of the driver along with the audio device 16.

The battery B can store electrical energy generated from kinetic power of the engine and supply the electric power to the various electronic components contained in the vehicle 1. For example, during driving of the vehicle 1, an alternator may convert the rotational energy of the engine into the electrical energy, and the battery B may receive and store the electrical energy from the alternator. Also, the battery B may supply the electric power to a starting motor for starting the engine and the electronic components of the vehicle 1 for driving the vehicle 1.

Generally, the battery may be classified into a lead-acid battery and a lithium ion battery depending on the type of electrolyte. The battery B installed in the vehicle 1 may be assumed to be the lithium ion battery.

The battery sensor 19 may acquire status information related to the battery B. For example, the battery sensor 19 may measure and output an output voltage of the battery B, an output current of the battery B, a temperature of the battery B, a rated capacity $C_B$ of the battery B, and the like.

The power management device 100 may acquire the output voltage of the battery B from the battery sensor 19, the output current of the battery B, the temperature of the battery B, the rated capacity $C_B$ of the battery B, and calculate a state of charge (SoC) of the battery B.

Here, the SoC of the battery B may indicate a degree of storage of the electrical energy in the battery B. The SoC may typically have a value between 0 and 100%, and may indicate the degree to which the battery B is charged between a fully discharged state (0%) and a full charged state (100%).

The power management device 100 may control the alternator through the EMS 11 based on the SoC of the battery B. For example, the power management device 100 may increase or decrease the electric power (or voltage) generated by the alternator, based on the SoC of the battery B. Specifically, the power management device 100 may control the alternator so that the SoC of the battery B is maintained at a predetermined level or more.

The electronic components may communicate with each other through a vehicle communication network NT. For example, the electronic components may exchange data with each other through Ethernet, Media Oriented Systems Transport (MOST), Flexray, CAN (Controller Area Network), LIN (Local Interconnect Network), and the like.

Figure 2:
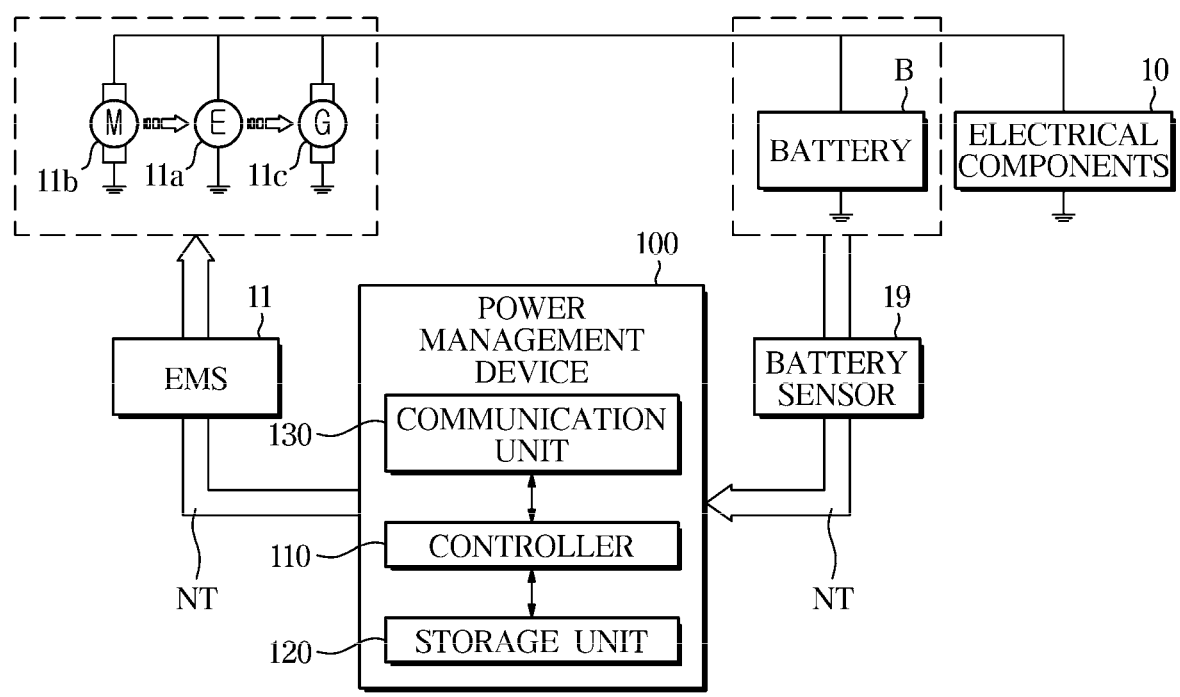
FIG. 2 is a view illustrating a configuration of a power management system according to an embodiment.

FIG. 2 is a view illustrating a configuration of a power management system according to an embodiment.

As shown in FIG. 2, the vehicle 1 includes a starting motor 11b, an engine 11a, an alternator 11c, the battery B, the electronic components 10, and the power management device 100.

The starting motor 11b may provide kinetic power to the engine 11a to start the engine 11a while the engine 11a is at a standstill. The starting motor 11b may receive electric power from the battery B. The starting motor 11b consumes a lot of electric power to start the engine 11a so that the battery B maintains a certain level of the SoC (for example, about 30% or more of the SoC) for an operation of the starting motor 11b.

The alternator 11c may generate electrical energy, that is, electric power, by the kinetic power of the engine 11a. The engine 11a may generate the kinetic power using explosive combustion of fuel, and the kinetic power of the engine 11a may be transmitted to a wheel through the transmission. At this time, some of the rotational force generated by the engine 11a may be provided to the alternator 11c, and the alternator 11c may produce the electric power from the kinetic power of the engine 11a.

The alternator 11c may comprise, for example, a rotor with a rotor coil (field coil) and a stator having a stator coil (armature coil). The rotor may be rotated by the rotation of the engine 11a, and the stator may be fixed. When a current is supplied to the rotor coil while the rotor is rotating by the engine 11a, a rotating magnetic field is generated, and an induced current is induced in the stator coil due to the rotating magnetic field.

Thereby, the alternator 11c may produce electric power. In addition, a magnitude of the magnetic field generated by the rotor changes depending on a magnitude of the current supplied to the rotor coils, and a magnitude of the induced current generated in the stator coils may change. In other words, the electric power generation amount of the alternator 11c may be adjusted depending on the magnitude of the current supplied to the coil of the rotor.

Some of the electric power produced by the alternator 11c may be supplied to the electronic components 10 of the vehicle 1 while the remaining portion may be stored in the battery B of the vehicle 1. In other words, the electric power produced by the generator 21e may be supplied to the electronic components 10, and the remaining electric power may be stored in the battery B.

The battery B may also supply the electric power to the starting motor 11b for starting the engine 11a when the engine 11a stops, and supply the electric power to the electronic components 10 of the vehicle 1. For example, if the electric power consumed by the electronic components 10 during the driving of the vehicle 1 is greater than the electric power produced by the alternator 11c, the battery B may supply the electric power to the electronic components 10. While the vehicle 1 is parked, the battery B may supply the electrical power to the electronic components 10.

The power management device 100 may acquire state information of the battery B from the battery sensor 19 and control the amount of the electric power generated by the alternator 11c through the EMS 11 depending on the state information of the battery B.

Specifically, the battery sensor 19 may collect the state information of the battery B such as the output voltage of the battery B, the output current of the battery B, the temperature of the battery B, and the rated capacity $C_B$ of the battery B, and receive the state information of the battery B from the battery sensor 19 through the vehicle communication network NT. The power management device 100 may generate a power generation control request for controlling the electric power generation amount of the alternator 11c depending on the status information of the battery B. The power management device 100 may transmit the electric power generation control request to the EMS 11 through the vehicle communication network NT and the EMS 11 may transmit the electric power generation control request to the alternator 11c. Thereby, the amount of power generation can be increased or decreased.

The power management device 100 may include a communication unit 130, a storage unit 120, and a controller 110.

The communication unit 130 may include a CAN transceiver that receives a communication signal from the electronic components 10 via the vehicle communication network NT and transmits the communication signal to the electronic components 10, and a communication controller for controlling an operation of the CAN transceiver.

The CAN transceiver may receive communication data from the electronic components 10 via the vehicle communication network NT and output the communication data to the controller 110, receive the communication data from the controller 110, and transmit the communication data to the electronic components 10 through a communications network (CNT). For example, the CAN transceiver may receive the state information of the battery B from the battery sensor 19 and/or travel information of the vehicle 1 from the EMS 11/the TCU 12 via the vehicle communication network NT. The CAN transceiver may also send the electric power generation control request to the EMS 11 via the vehicle communication network NT.

The communication unit 130 may exchange data with the electronic components 10 of the vehicle 1 through the vehicle communication network NT and the power management device 100 may communicate with the electronic components 10 such as the EMS 11, the battery sensor 19, and the like, through the communication unit 130.

The storage unit 120 may include a storage medium for storing control data for controlling the power management device 100 and a storage controller for controlling storage/deletion/loading of data stored in the storage medium.

The storage medium may include a solid state drive (SSD), a hard disk drive (HDD), or the like, and may store various data for managing the SoC of the battery B.

The storage medium may store the SoC of the battery B corresponding to the output voltage of the battery B, the output current of the battery B, and the temperature of the battery B. For example, the storage medium may store a battery model (look-up table) that includes the output voltage of the battery B, the output current of the battery B, the temperature of the battery B, and the corresponding SoC of the battery B.

The storage unit 120 may store data in the storage medium responsive to a storage signal of the controller 110 and output data stored in the storage medium to the controller 110 responsive to a loading signal of the controller 110. For example, the storage controller receives a retrieving request of the SoC of the battery B corresponding to the output voltage of the battery B, the output current of the battery B, and the temperature of the battery B from the controller 110, and retrieve the SoC of the battery B in the storage medium corresponding to the output voltage of the battery B, the output current of the battery B, and the temperature of the battery B. The storage controller may output the retrieved SoC of the battery B.

The controller 110 may include a memory for storing control programs and/or control data for controlling the power management device 100, and a processor for generating control signals according to control programs and control data stored in the memory.

The memory may temporarily store communication data received via the communication unit 130 and/or storage data stored in the storage unit 120. The communication data may include the state information such as the output voltage of the battery B, the output current of the battery B, and the temperature of the battery B, and the storage data may include the SoC of the battery B.

The memory may provide a program and/or data to the processor responsive to a memory control signal of the processor.

The memory may include a volatile memory such as Static Random Access Memory (S-RAM) for temporarily storing data and D-RAM (Dynamic Random Access Memory). In addition, the memory may include a non-volatile memory such as ROM (Read Only Memory), EPROM (Erasable Programmable Read Only Memory), and EEPROM (Electrically Erasable Programmable Read Only Memory).

The processor may include various logic circuits and arithmetic circuits, process data according to the program provided from the memory, and generate control signals according to the processing results.

The processor may estimate the SoC of the battery B based on the output current of the battery B or using the battery model of the SoC of the battery B stored in the storage unit 120 based on the output voltage of the battery B, the output current of the battery B and the temperature of the battery B. For example, a computation load of the processor for estimating the SoC of the battery B based on the output current of the battery B may be small, but the estimated SoC of the battery B may not be equal to an actual SoC of the battery B. The computation load of the processor for calculating the SoC of the battery B using the battery model of the storage unit 120 may be large, but the estimated SoC of the battery B may not be equal to the actual SoC of the battery B.

The processor may estimate the SoC of the battery B based on the output current of the battery B. The processor may correct the error of the estimated SoC of the battery B based on the determined SoC of the battery B using the battery model of the storage unit 120 at an appropriate time.

In this way, the controller 110 may calculate the SoC of the battery B based on the output of the battery sensor 19 and generate the electric power generation control signal for controlling the alternator 11c based on the SoC of the battery B.

Hereinafter, a method for determining the SoC of the battery B by the power management device 100 will be described.

Figure 3:
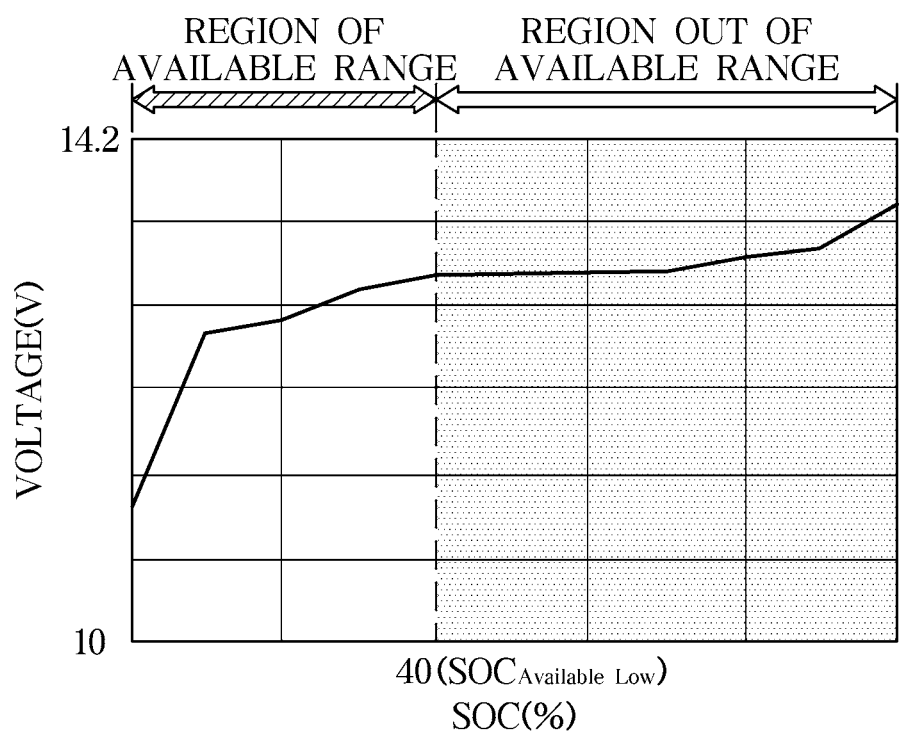
FIG. 3 is a view illustrating an available range of a battery according to a SoC (State of Charge) of the battery according to an embodiment.
Figure 4:
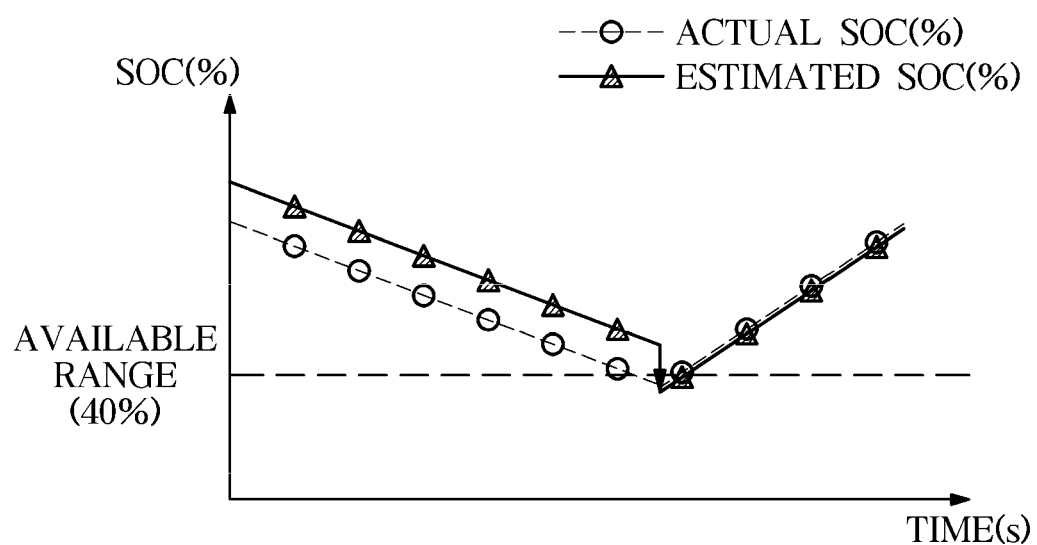
FIG. 4 is a view illustrating an error between an estimated SoC of a battery and an actual SoC of the battery according to an embodiment.
Figure 5:
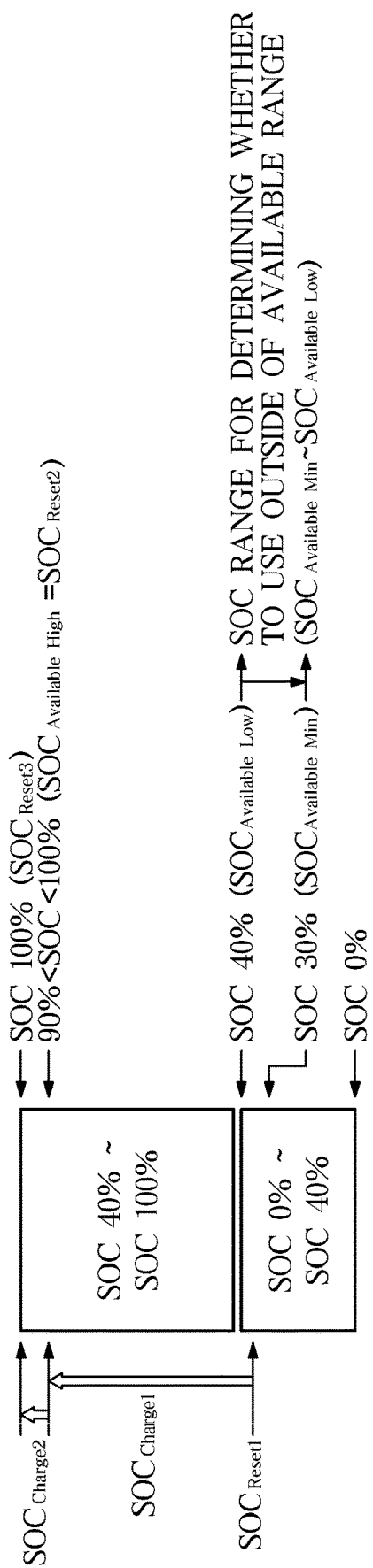
FIG. 5 is a view illustrating a SoC of a battery according to an embodiment.
Figure 7:
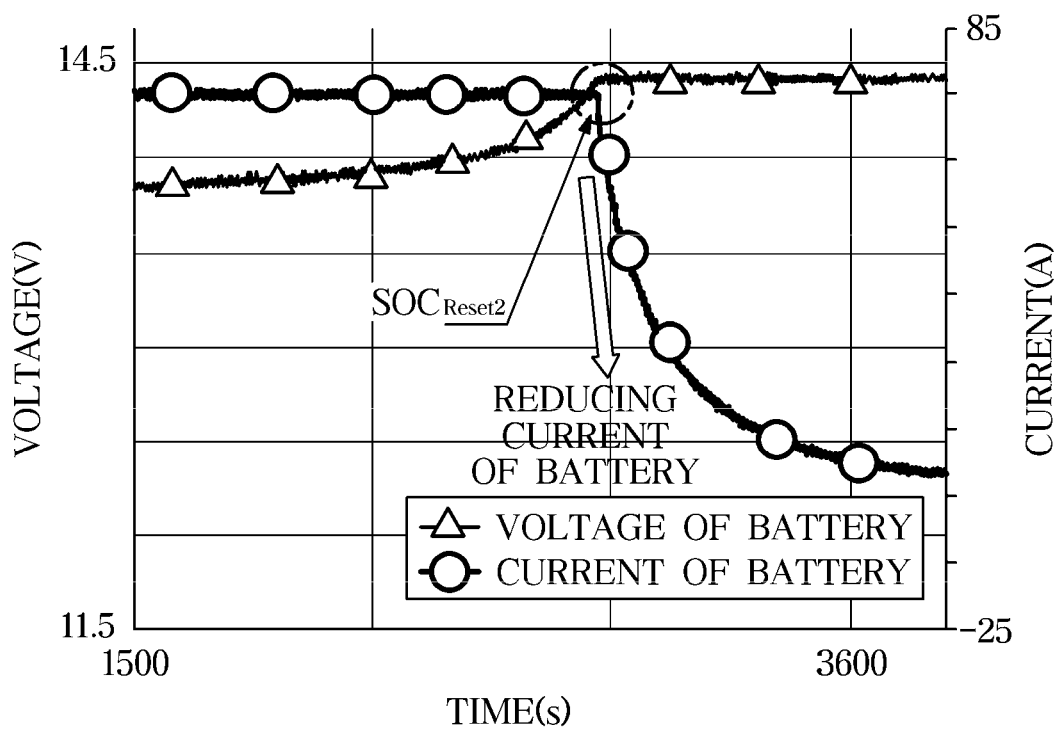
FIG. 7 illustrates a method of calculating a second reference SoC of a battery according to an embodiment.
Figure 8:
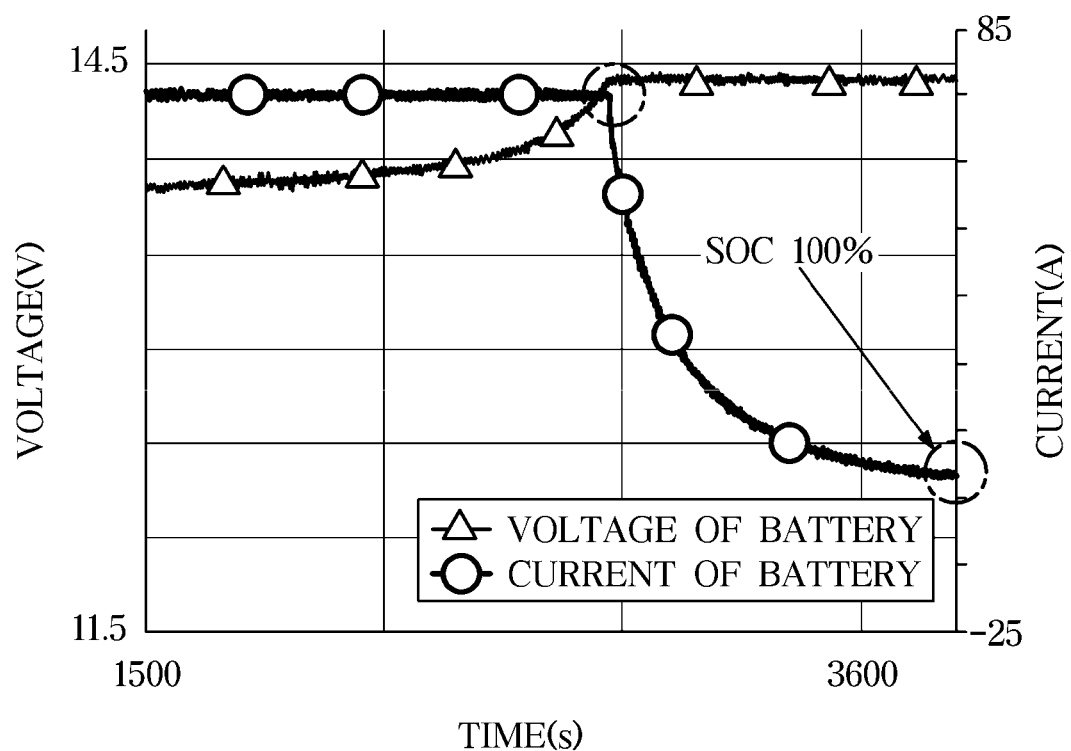
FIG. 8 illustrates a method of calculating a third reference SoC of a battery according to an embodiment.
Figure 10:
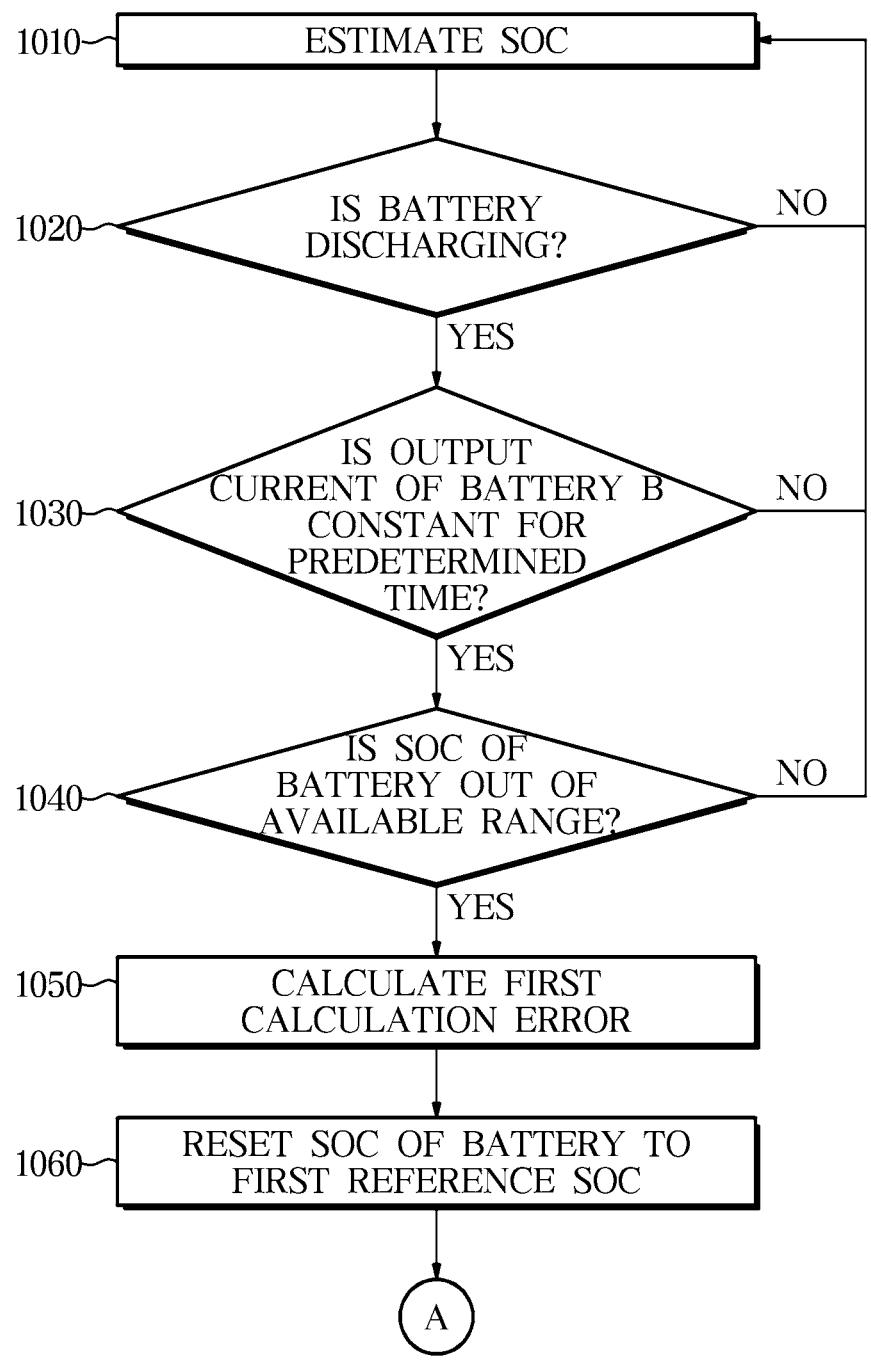
FIGS. 10, 11, 12 and 13 are views illustrating operations of a power management device according to an embodiment.
Figure 11:
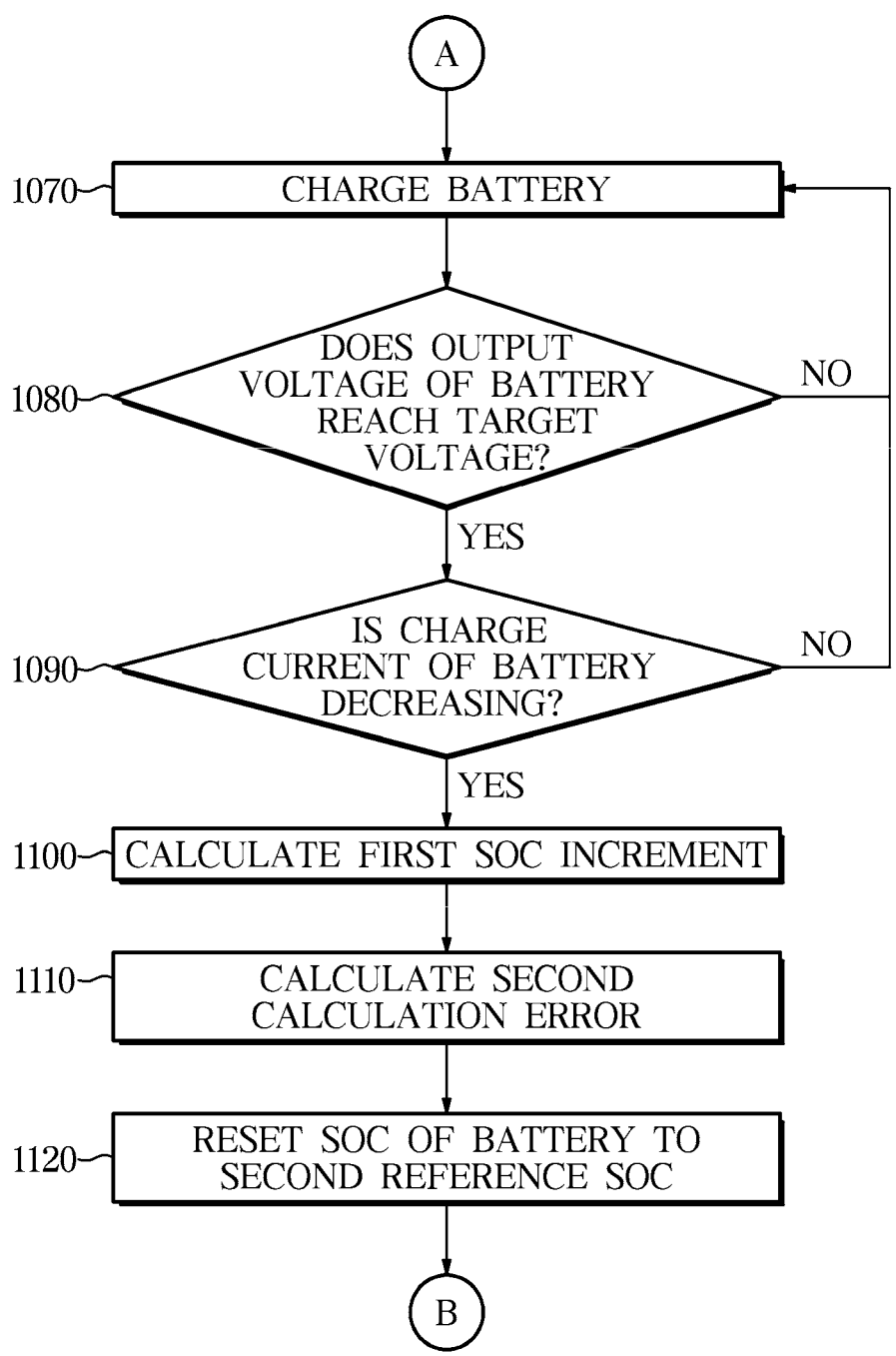
Figure 12:
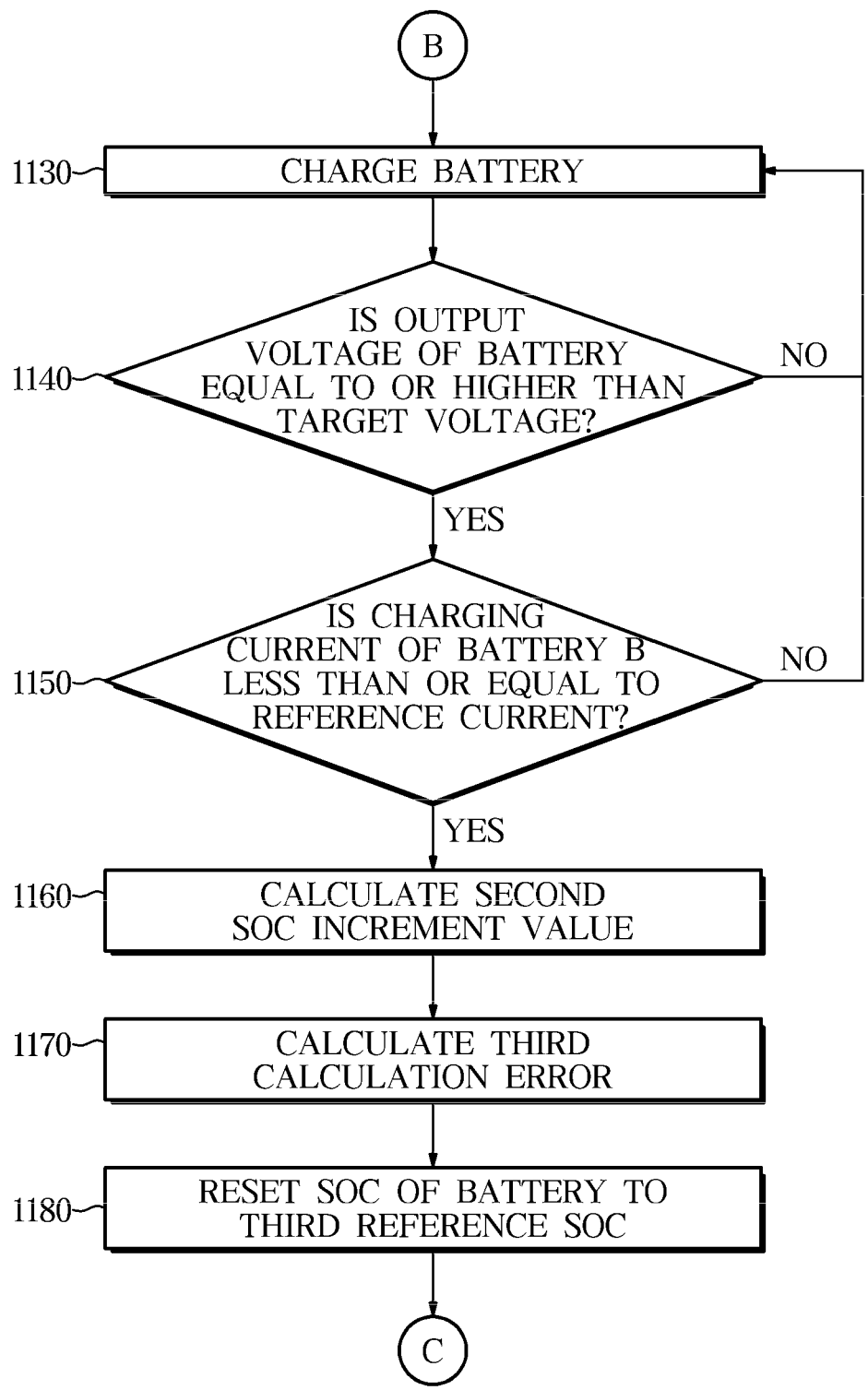
Figure 13:
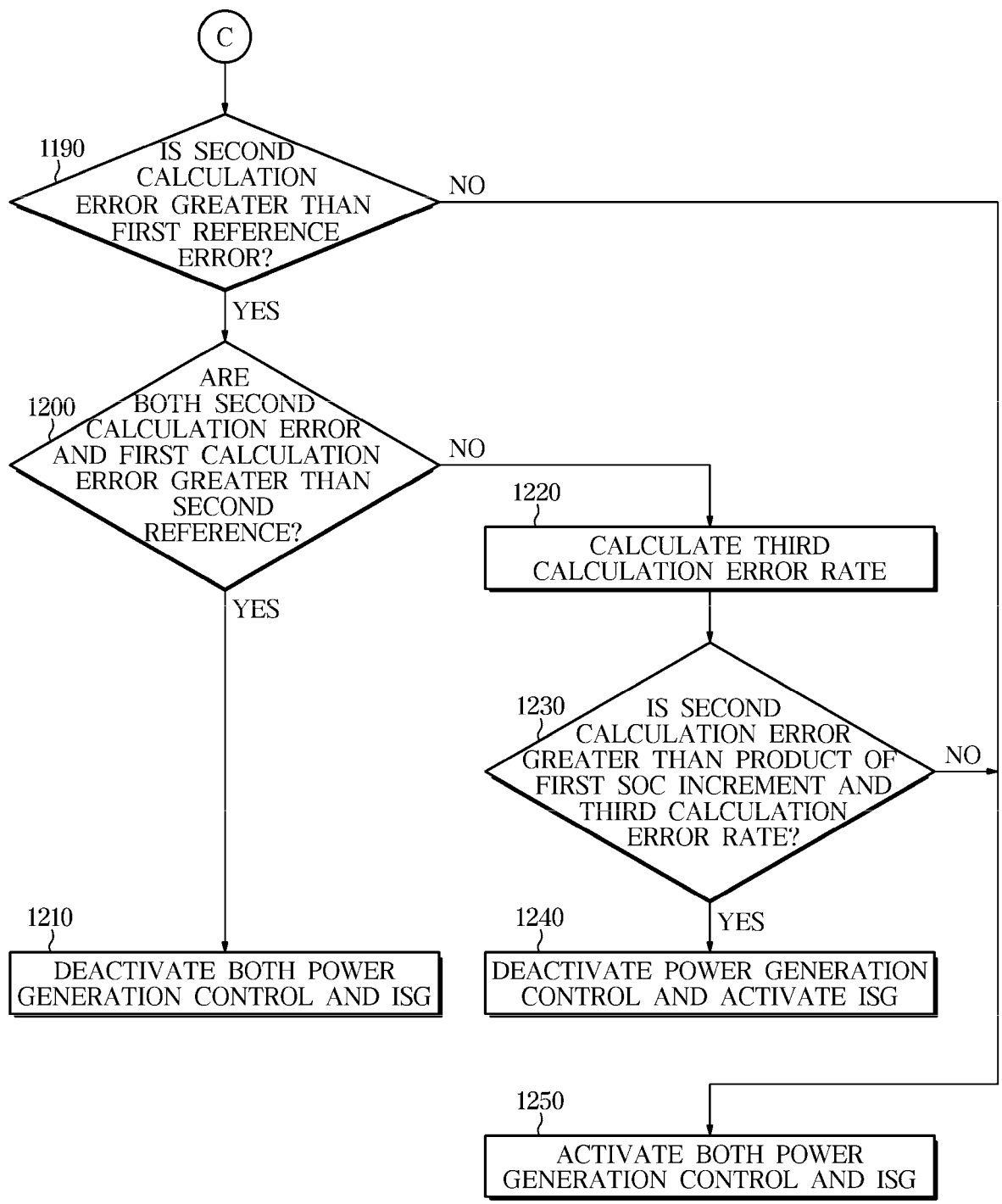

FIG. 3 is a view illustrating an available range of a battery according to a SoC (State of Charge) of the battery according to an embodiment. FIG. 4 is a view illustrating an error between an estimated SoC of a battery and an actual SoC of the battery according to an embodiment. FIG. 5 is a view illustrating a SoC of a battery according to an embodiment. FIG. 6 illustrates a method of calculating a first reference SoC of a battery according to an embodiment. FIG. 7 illustrates a method of calculating a second reference SoC of a battery according to an embodiment. FIG. 8 illustrates a method of calculating a third reference SoC of a battery according to an embodiment. In addition, FIG. 9 is a view illustrating an example of how a power management device according to one embodiment activates or deactivates power generation control and/or idle stop & go control.

The power management device 100 may control the alternator 11c and the electronic components 10 based on the SoC of the battery B. In other words, the power management device 100 may control the power generation and the power consumption of the vehicle 1 based on the SoC of the battery B.

The SoC of the battery B may be partitioned into an available range and out of the available range. The available range of the battery B may indicate an interval in which the battery B can operate without a sudden drop in the durability of the battery B. In other words, if the SoC of the battery B is within the available range, the durability of the battery B may be prevented from being drastically reduced (the battery B may be prevented from rapidly aging). However, if the SoC of the battery B is out of the available range, the durability of the battery B may deteriorate rapidly (the battery B may rapidly be aged). For example, as shown in FIG. 3, the available range of the battery B may include a range where the SoC is greater than or equal to 40%.

The power management device 100 may manage the SoC of the battery B so that the SoC of the battery B is within the available range. In other words, the power management device 100 may control the power generation and the power consumption of the vehicle 1 so that the SoC of the battery B is within the available range.

The power management device 100 may determine the SoC of the battery B based on an output current of the battery B or determine the SoC of the battery B using a battery model.

The power management device 100 may estimate the SoC of the battery B by integrating the output current (charge current and discharge current) of the battery B based on an initial SoC of the battery B. For example, the power management device 100 may estimate the SoC of the battery B from the output current of the battery B using Equation (1).

$$SOC = SOC_{ini} + \frac{\int (\eta \times I_B)dt}{C_B} \times 100\%. \quad \text{Equation (1)}$$

Herein, the SOC represents an estimated SoC of the battery B, SOC_ini represents the initial SoC of the battery B, $C_B$ represents the rated capacity of the battery B, eta represents charge/discharge efficiency of the battery B, $I_B$ represents the output current of the battery B.

The estimated SoC of the battery B estimated using Equation (1) may be defined as an estimated SoC (SOC_calculation). However, Equation (1) may not accurately reflect a physical phenomenon caused by charging of the battery B. Estimating the SoC of the battery B using Equation (1) for a long period of time may cause an error between the estimated SoC of the battery B and the actual SoC of the battery B. For example, the estimated SoC (SOC_calculation) may be greater than the actual SoC of the battery B and, in some cases, the actual SoC of the battery B may out of the available range. As a result, the durability of the battery B may be rapidly lowered.

The power management device 100 may prevent the actual SoC of the battery B from deviating from the available range by correcting the estimated SoC (SOC_calculation).

If the estimated SoC (SOC_calculation) approaches the available range, the power management device 100 can determine the SoC of the battery B using the battery model representing the SoC of the battery B. During a discharge of the battery B, an output voltage of the battery B may vary depending on the output current of the battery B and the SoC of the battery B. Accordingly, the power management device 100 may determine the SoC of the battery B from the output voltage of the battery B and the output current of the battery B.

For example, as shown in FIG. 4, when the estimated SoC of the battery B approaches 40%, the power management device 100 may determine the actual SoC of the battery B using the battery model. The power management device 100 may input the output voltage of the battery B, the output current of the battery B, and the temperature of the battery B to the battery model, and determine the actual SoC of the battery B from the output of the battery model.

The power management device 100 may limit a range for determining the SoC of the battery B using the battery model in order to reduce an amount of computation of the processor. For example, the power management device 100 may determine the SoC of the battery B using the battery model if the estimated SoC of the battery B is between 30% and 40%.

The SoC of the battery B may be defined by a plurality of indicators as shown in FIG. 5.

For example, a SoC representing a lower limit (e.g., 40%) of the available range may be defined as a lower limit SoC (SOC_available_low), and the lowest allowable SoC (for example, 30%) under the available range may be defined as a lowest SoC (SOC_available_min) (e.g., 30%). The lowest SoC (SOC_available_min) (30%) may be defined by the sum of the SoC (20%) required for starting the engine and the SoC operation error (10%), and the lower limit SoC (SOC_available_low) may be defined by the sum of the lowest SoC (SOC_available_min) (30%) and the SoC durability reduction range (10%).

When the SoC of the battery B is out of the available range, the power management device 100 may determine the SoC of the battery B using the battery model, and define the determined SoC of the battery B as a first reference SoC (SOC_reset1).

The first reference SoC (SOC_reset1) may be determined based on the output voltage of the battery B and the output current of the battery B as shown in FIG. 6. For example, if the output current of the battery B is −40 A (Ampere) (discharge current 40 A) and the output voltage of the battery B is V1_40/30/20 A, the first reference SoC (SOC_reset1) may be 40%. If the output current of the battery B is −30 A (Ampere) (discharge current 30 A) and the output voltage of the battery B is V1_40/30/20 A, the first reference SoC (SOC_reset1) may be 35%. If the output current of the battery B is −20 A (Ampere) (discharge current 20 A) and the output voltage of the battery B is V1_40/30/20 A, the first reference SoC (SOC_reset1) may be 32%.

Since the first reference SoC (SOC_reset1) is calculated based on the battery model, the first reference SoC (SOC_reset1) may represent a more accurate SoC than the estimated SoC (SOC_calculation). Therefore, if the estimated SoC (SOC_calculation) is out of the available range, the power management device 100 may reset (adjust) the SoC of the battery B to the first reference SoC (SOC_reset1).

In addition, the power management device 100 may store a difference between the estimated SoC (SOC_calculation) and the first reference SoC (SOC_reset1) as a first calculation error (SOC_reset1_error) as shown in Equation (2).

$$SOC_{reset1\_Lerror} = SOC_{calculation} - SOC_{reset1} \quad \text{Equation (2)}$$

When the SoC of the battery B is out of the available range, the power management device 100 may control the alternator 11c to charge the battery B. In addition, the power management device 100 may continuously estimate the estimated SoC (SOC_calculation) while charging the battery B.

The operation of the alternator 11c increases the SoC of the battery B and the output voltage of the battery B may also increase together. When the output voltage of the battery B reaches a target voltage (for example, approximately 14.4 V) during the charging of the battery B, a charging current of the battery B decreases as shown in FIG. 7. The power management device 100 may define a voltage point at which the output voltage of the battery B reaches the target voltage and the charging current of the battery B decreases during the charging of the battery B as a second reference SoC (SOC_reset2, 90%<SOC_reset2<100%).

The estimated SoC (SOC_calculation) may also increase together with the operation of the alternator 11c. A value increased from the first reference SoC (SOC_reset1) to the SoC, at which the output voltage of the battery B reaches the target voltage and the charging current of the battery B decreases, may be defined as a first SoC increment (SOC_charge1). The power management device 100 may set the difference between the estimated SoC (SOC_calculation) and the first reference SoC (SOC_reset1), which is determined when the output voltage of the battery B reaches the target voltage and the charging current of the battery B decreases, as the first SoC increment (SOC_charge1).

As shown in Equation (3), the power management device 100 may set a difference between a value, which is a difference (SOC_reset2−SOC_reset1) between the second reference SoC (SOC_reset2) and the first reference SoC (SOC_reset1), and the first SoC increment (SOC_charge1) as a second calculation error (SOC_reset2_error).

$$SOC_{reset2\_error} = (SOC_{reset2} - SOC_{reset1}) - SOC_{charge1} \quad \text{Equation (3)}$$

The power management device 100 may also reset the estimated SoC (SOC_calculation) to the second reference SoC (SOC_reset2) when the output voltage of the battery B reaches the target voltage and the charging current of the battery B decreases while the battery B is being charged.

The SoC of the battery B may be additionally increased by the operation of the alternator 11c. During charging of the battery B, the output voltage of the battery B is approximately equal to the target voltage (for example, 14.4 V), and the charging current of the battery B may be below a reference current as shown in FIG. 8. The power management device 100 may set a point at which the output voltage of the battery B is substantially equal to or higher than the target voltage (for example, 14.4 V) while the charging current of the battery B is equal to or lower than the reference current during the charging of the battery B to a third reference SoC (SOC_reset3). The third reference SoC (SOC_reset3) may represent the SoC of approximately 100%.

The estimated SoC (SOC_calculation) may also increase together with the operation of the alternator 11c.

A value increased from the second reference SoC (SOC_reset2) to the SoC, at which the output voltage of the battery B is approximately equal to or higher than the target voltage (for example, 14.4V) and the charging current of the battery B is equal to or lower than the reference current during the charging of the battery B, may be defined as a second SoC increment (SOC_charge2).

As shown in Equation (4), the power management device 100 may set a difference between a value, which is a difference between the third reference SoC (SOC_reset3) and the second reference SoC (SOC_reset2) (SOC_reset3−

SOC_reset2), and the second SoC increment (SOC_charge2) as a third calculation error (SOC_reset3_error).

$$SOC_{reset3\_error} = (SOC_{reset3} - SOC_{reset2}) - SOC_{charge2} \quad \text{Equation (4)}$$

Then, the power management device 100 may determine aging of the battery B based on the first calculation error (SOC_reset1_error), the second calculation error (SOC_reset2_error), and the third calculation error (SOC_reset3_error), and the power management device 100 may activate or deactivate a power generation control and/or an idle stop & go (ISG) according to the degree of the aging of the battery B. The power generation control indicates the control power generation of the alternator 11c based on the SoC of the battery B, and the ISG may indicate that the engine of the vehicle 1 is turned off during stopping thereof.

For example, the power management device 100 may determine whether the battery B is aged based on the second calculation error (SOC_reset2_error).

If the battery B is not aged, the first SoC increment (SOC_charge1) may be the same as a difference between the second reference SoC (SOC_reset2) and the first reference SoC (SOC_reset1). In other words, the second calculation error (SOC_reset2_error) may have a value of '0' or the like.

However, if the battery B is aged, the first SoC increment (SOC_charge1) may be less than the difference between the second reference SoC (SOC_reset2) and the first reference SoC (SOC_reset1). In other words, the second calculation error (SOC_reset2_error) may have a relatively large value.

The power management device 100 may compare the second calculation error (SOC_reset2_error) with a first reference error (β). If the second calculation error (SOC_reset2_error) is smaller than the first reference error (β), the power management device 100 may determine that the battery B is not aged. The power management device 100 may also activate both the power generation control and the ISG.

If the second calculation error (SOC_reset2_error) is equal to or greater than the first reference error (β), the power management device 100 may determine whether the second calculation error (SOC_reset2_error) is due to the aging of the battery B or due to errors in a SoC estimation.

Specifically, when the second calculation error (SOC_reset2_error) is equal to or greater than the first reference error (β), the power management device 100 may compare the second calculation error (SOC_reset2_error) with a second reference error (α) and compare the first calculation error (SOC_reset1_error) with the first reference error (β). At this time, the second reference error (α) may be a value larger than the first reference error (β).

If the first calculation error (SOC_reset1_error) and the second calculation error (SOC_reset2_error) are both greater than the second reference error (α), the power management device 100 may determine that the second calculation error (SOC_reset2_error) is due to the aging of the battery B. In other words, the power management device 100 may determine that the battery B is aged and deactivate both the power generation control and the ISG.

If the first and second calculation errors (SOC_reset1_error and SOC_reset2_error) are not both greater than the second reference error (α), the power management device 100 may determine that degree of the aging of the battery B is small.

As shown in Equation (5), the power management device 100 may set a value, which is a quotient of the third calculation error (SOC_reset3_error) divided by a difference (SOC_reset3-SOC_reset2) between the third reference SoC (SOC_reset3) and the second reference SoC (SOC_reset2), as a third calculation error rate (SOC_reset3_error_ratio).

$$SOC_{reset3\_error\_rate} = SOC_{reset3\_error} \div (SOC_{reset3} - SOC_{reset2}) \quad \text{Equation (5)}$$

The power management device 100 may compare the second calculation error (SOC_reset2_error) with a product of the first SoC increment (SOC_charge1) and the third calculation error rate (SOC_reset3_error_ratio).

If the second calculation error (SOC_reset2_error) is greater than the product of the first SoC increment (SOC_charge1) and the third calculation error rate (SOC_reset3_error_ratio), the power management device 100 may determine that the degree of the aging of the battery B is intermediate and that the second calculation error (SOC_reset2_error) is due to the aging of the battery B and an error of the SoC estimation. In addition, the power management device 100 may deactivate the generation control and activate the ISG.

The power management device 100 may reset the available range based on the first calculation error (SOC_reset1_error). For example, the power management device 100 may reset (adjust) a lower limit of the available range of the battery B to the sum of the current lower limit SoC (SOC_available_low) and the first calculation error (SOC_reset1_error).

If the second calculation error (SOC_reset2_error) is less than or equal to the product of the first SoC increment (SOC_charge1) and the third calculation error rate (SOC_reset3_error_ratio), the power management device 100 may determine that the degree of the aging of the battery B is very small and that the second calculation error (SOC_reset2_error) is due to the error of the SoC estimation. In addition, the power management device 100 may activate both the power generation control and the ISG.

The power management device 100 may reset the available range based on the first calculation error (SOC_reset1_error). For example, the power management device 100 may reset (adjust) the lower limit of the available range of the battery B to the sum of the current lower limit SoC (SOC_available_low) and the first calculation error (SOC_reset1_error).

In summary, as shown in FIG. 9, if the second calculation error (SOC_reset2_error) is smaller than the first reference error (β), the power management device 100 may activate both the power generation control and the ISG.

If the second calculation error (SOC_reset2_error) is equal to or greater than the first reference error (β), the power management device 100 may compare the second calculation error (SOC_reset2_error) and the first calculation error (SOC_reset1_error) with the second reference error (α).

If both the first calculation error (SOC_reset1_error) and the second calculation error (SOC_reset2_error) are greater than the second reference error (α), the power management device 100 may deactivate both the power generation control and the ISG.

If neither the first calculation error (SOC_reset1_error) nor the second calculation error (SOC_reset2_error) is greater than the second reference error (α), the power management device 100 may compare the second calculation error (SOC_reset2_error) with the product of the first SoC increment (SOC_charge1) and the third calculation error rate (SOC_reset3_error_ratio).

If the second calculation error (SOC_reset2_error) is equal to or less than the product of the first SoC increment (SOC_charge1) and the third calculation error rate (SOC_reset3_error_ratio), the power management device 100 may determine that the power management device 100 activates both the power generation control and the ISG and resets (adjust) the available range of the SoC of the battery B.

If the second calculation error (SOC_reset2_error) is greater than the product of the first SoC increment (SOC_charge1) and the third calculation error rate (SOC_reset3_error_ratio), the power management device 100 may deactivate the power generation control and activate the ISG. In addition, the power management device 100 may reset (adjust) the available range of the SoC of the battery B.

FIGS. 10, 11, 12 and 13 are views illustrating operations of a power management device according to an embodiment.

Referring to FIGS. 10, 11, 12 and 13, the power management device 100 estimates the SoC of the battery B during driving of the vehicle 1 (operation 1010).

The power management device 100 may estimate the SoC of the battery B by integrating the output current (charge current and discharge current) of the battery B based on the initial SoC of the battery B. The estimated SoC of the battery B may be defined as the estimated SoC (SOC_calculation).

The power management device 100 determines whether the battery B is being discharged (operation 1020).

During the discharge of the battery B, an output voltage of the battery B may vary depending on the output current of the battery B and the SoC of the battery B, and the power management device 100 may determine the SoC of the battery B from the output voltage of the battery B and the output current of the battery B.

The power management device 100 may determine whether the battery B is discharging to determine the correct SoC of the battery B.

If the battery B is not discharging (No in operation 1020), the power management device 100 may estimate the SoC of the battery B.

If the battery B is discharging (Yes in operation 1020), the power management device 100 determines whether the output current of the battery B is constant for a predetermined time (operation 1030).

The power management device 100 may determine the SoC of the battery B based on the output current and the output voltage of the battery B after the output current of the battery B is stabilized in order to determine the correct SoC of the battery B.

If the output current of the battery B is not constant for a predetermined time (No in operation 1030), the power management device 100 may estimate the SoC of the battery B If the output current of the battery B is constant for a predetermined time (Yes in operation 1030), the power management device 100 determines whether the SoC of the battery B is out of the available range (operation 1040).

The power management device 100 may determine the SoC of the battery B using the battery model representing the SoC of the battery B and determine whether the SoC of the battery B is out of the available range (for example, 40% or more).

If the SoC of the battery B is within the available range (No in operation 1040), the power management device 100 may estimate the SoC of the battery B.

If the SoC of the battery B is out of the available range (Yes in operation 1040), the power management device 100 calculates the first calculation error (SOC_reset1_error) (operation 1050).

When the SoC of the battery B is out of the usable range, the power management device 100 may determine the SoC of the battery B using the battery model and define the SoC of the determined battery B as the first reference SoC (SOC_reset1).

The first reference SoC (SOC_reset1) may be determined based on the output voltage of the battery B and the output current of the battery B.

The power management device 100 may define a difference between the estimated SoC (SOC_calculation) and the first reference SoC (SOC_reset1) as the first calculation error (SOC_reset1_error).

Then, the power management device 100 resets (corrects) the SoC of the battery B to the first reference SoC (SOC_reset1) (operation 1060).

The power management device 100 may reset the estimated SoC (SOC_calculation) to the first reference SoC (SOC_reset1).

Then, the power management device 100 charges the battery B (operation 1070).

When the SoC of the battery B is out of the available range, the power management device 100 may control the alternator 11c to charge the battery B. In addition, the power management device 100 may consistently estimate the estimated SoC (SOC_calculation) while charging the battery B.

Then, the power management device 100 determines whether the output voltage of the battery B has reached the target voltage (e.g., approximately 14.4V) (operation 1080).

The SoC of the battery B is increased by an operation of the alternator 11c and the output voltage of the battery B may also rise together.

If the output voltage of the battery B has not reached the target voltage (No in operation 1080), the power management device 100 may continue charging the battery B.

When the output voltage of the battery B reaches the target voltage (Yes in operation 1080), the power management device 100 determines whether the charge current of the battery B is decreasing (operation 1090).

When the output voltage of the battery B reaches the target voltage during the charging of the battery B, the charging current of the battery B begins to decrease.

The power management device 100 may determine whether the charge current decreases while an rpm (revolution per minute) of the engine 11a increases to accurately determine whether the charge current is decreasing.

If the charging current of the battery B is not decreased (No in operation 1090), the power management device 100 may continue charging the battery B If the charging current of the battery B is decreased (Yes in operation 1090), the power management device 100 calculates the first SoC increment (SOC_charge1) (operation 1100).

A value increased from the first reference SoC (SOC_reset1) until the output voltage of the battery B reaches the target voltage and the charge current of the battery B decreases is defined as the first SoC increment (SOC_charge1).

The power management device 100 may calculate a difference between the estimated SoC (SOC_calculation) and the first reference SoC (SOC_reset1), which is determined when the output voltage of the battery B reaches the target voltage and the charging current of the battery B decreases, as the first SoC increment (SOC_charge1).

Then, the power management device 100 calculates the second calculation error (SOC_reset2_error) (1110).

The power management device 100 may define a voltage point at which the output voltage of the battery B reaches the target voltage and the charging current of the battery B decreases during the charging of the battery B as the second reference SoC (SOC_reset2).

The power management device 100 may calculate the difference between the second reference SoC (SOC_reset2) and the first reference SoC (SOC_reset1) (SOC_reset2-SOC_reset1) and the first SoC increment (SOC_charge1).

The power management device 100 may calculate a difference between a value, which is a difference (SOC_reset2-SOC_reset1) between the second reference SoC (SOC_reset2) and the first reference SoC (SOC_reset1), and the first SoC increment (SOC_charge1) as the second calculation error (SOC_reset2_error).

Then, the power management device 100 resets (corrects) the SoC of the battery B to the second reference SoC (SOC_reset2) (operation 1120).

The power management device 100 may reset the estimated SoC (SOC_calculation) to the second reference SoC (SOC_reset2).

Then, the power management device 100 further charges the battery B (operation 1130).

The power management device 100 may control the alternator 11c to charge the battery B. In addition, the power management device 100 may consistently estimate the estimated SoC (SOC_calculation) while charging the battery B.

Then, the power management device 100 determines whether the output voltage of the battery B is equal to or higher than the target voltage (for example, about 14.4 V) (operation 1140).

If the output voltage of the battery B is not higher than the target voltage (No in operation 1140), the power management device 100 can continue charging the battery B If the output voltage of the battery B is equal to or higher than the target voltage (No in operation 1140), the power management device 100 determines whether the charging current of the battery B is less than or equal to the reference current (operation 1150).

When the output voltage of the battery B reaches the target voltage during the charging of the battery B, the charging current of the battery B decreases, and the charging current of the battery B may become less than a reference current.

The power management device 100 may determine whether the charge current is less than or equal to the reference current while the rpm of the engine 11a increases to accurately determine whether the charge current is less than or equal to the reference current.

If the charge current of the battery B is not less than or equal to the reference current (No in operation 1150), the power management device 100 may continue charging the battery B If the charging current of the battery B is less than the reference current (Yes in operation 1150), the power management device 100 calculates the second SoC increment (SOC_charge2) (operation 1160).

A value increased from the second reference SoC (SOC_reset2) to the SoC, at which the output voltage of the battery B is approximately equal to or higher than the target voltage (for example, 14.4V) and the charging current of the battery B is equal to or lower than the reference current during the charging of the battery B, may be defined as the second SoC increment (SOC_charge2).

The power management device 100 may calculate a difference between the estimated SoC (SOC_calculation) and the second reference SoC (SOC_reset2), which is determined when the output voltage of the battery B reaches the target voltage and the charging current of the battery B decreases, as the second SoC increment (SOC_charge2).

Then, the power management device 100 calculates the third calculation error (SOC_reset3_error) (operation 1170).

The power management device 100 may define a voltage point at which the output voltage of the battery B is higher than the target voltage while the charging current of the battery B is lower than the reference current during the charging of the battery B as the third reference SoC (SOC_reset3). The third reference SoC (SOC_reset3) may represent the SoC of approximately 100%.

The power management device 100 may set a difference between a value, which is a difference between the third reference SoC (SOC_reset3) and the second reference SoC (SOC_reset2) (SOC_reset3-SOC_reset2), and the second SoC increment (SOC_charge2) as the third calculation error (SOC_reset3_error).

Then, the power management device 100 resets (corrects) the SoC of the battery B to the third reference SoC (SOC_reset3) (operation 1180).

The power management device 100 may reset the estimated SoC (SOC_calculation) to the third reference SoC (SOC_reset3).

Then, the power management device 100 determines whether the second calculation error (SOC_reset2_error) is greater than the first reference error ($\beta$) (operation 1190).

The power management device 100 may compare the second calculation error (SOC_reset2_error) with the first reference error ($\beta$).

If the second calculation error (SOC_reset2_error) is greater than the first reference error ($\beta$) (Yes in operation 1190), the power management device 100 determines whether both the second calculation error (SOC_reset2_error) and the first calculation error (SOC_reset1_error) are greater than the second reference error ($\alpha$) (operation 1200).

The power management device 100 may compare the second calculation error (SOC_reset2_error) with the second reference error ($\alpha$) and compare the first calculation error (SOC_reset1_error) with the second reference error ($\alpha$). At this time, the second reference error ($\alpha$) may be a value larger than the first reference error ($\beta$).

If both the first calculation error (SOC_reset1_error) and the second calculation error (SOC_reset2_error) are greater than the second reference error ($\alpha$) (Yes in operation 1200), the power management device 100 determines that the battery B is aged, and deactivates both the power generation control and the ISG (operation 1210).

If both the first calculation error (SOC_reset1_error) and the second calculation error (SOC_reset2_error) are greater than the second reference error ($\alpha$), the power management device 100 may determine that the second calculation error (SOC_reset2_error) is due to the aging of the battery B.

If neither the first calculation error (SOC_reset1_error) nor the second calculation error (SOC_reset2_error) is greater than the second reference error ($\alpha$) (No in operation 1200), the power management device 100 calculates the third calculation error rate (SOC_reset3_error_ratio) (operation 1220).

The power management device 100 may set a value, which is a quotient of the third calculation error (SOC_reset3_error) divided by a difference (SOC_reset3-SOC_reset2) between the third reference SoC (SOC_reset3) and the second reference SoC (SOC_reset2), as the third calculation error rate (SOC_reset3_error_ratio).

Then, the power management device 100 determines whether the second calculation error (SOC_reset2_error) is greater than the product of the first SoC increment (SOC_charge1) and the third calculation error rate (SOC_reset3_error_ratio) (operation 1230).

The power management device 100 may compare the second calculation error (SOC_reset2_error) with the product of the first SoC increment (SOC_charge1) and the third calculation error rate (SOC_reset3_error_ratio).

If the second calculation error (SOC_reset2_error) is greater than the product of the first SoC increment (SOC_charge1) and the third calculation error rate (SOC_reset3_error_ratio) (Yes in operation 1230), the power management device 100 deactivates the power generation control and activates the ISG (operation 1240).

If the second calculation error (SOC_reset2_error) is greater than the product of the first SoC increment (SOC_charge1) and the third calculation error rate (SOC_reset3_error_ratio), the power management device 100 may determine that the degree of the aging of the battery B is intermediate and that the second calculation error (SOC_reset2_error) is due to the aging of the battery B and an error of the SoC estimation.

If the second calculation error (SOC_reset2_error) is not greater than the product of the first SoC increment (SOC_charge1) and the third calculation error rate (SOC_reset3_error_ratio) (No in operation 1230), the power management device 100 activates both the power generation control and the ISG (operation 1250).

If the second calculation error (SOC_reset2_error) is less than or equal to the product of the first SoC increment (SOC_charge1) and the third calculation error rate (SOC_reset3_error_ratio), the power management device 100 may determine that the degree of the aging of the battery B is very small and that the second calculation error (SOC_reset2_error) is due to the error of the SoC estimation.

In addition, if the second calculation error (SOC_reset2_error) is not greater than the first reference error ($\beta$) (No in operation 1190), the power management device 100 activates both the power generation control and the ISG (operation 1250).

If the second calculation error (SOC_reset2_error) is smaller than the first reference error ($\beta$), the power management device 100 may determine that the battery B is not aged.

By the above operation, the calculation error of the SoC of the battery B can be reduced and the aging of the battery B can be prevented.

As is apparent from the above description, the embodiments of the present disclosure may provide a vehicle capable of efficiently managing a battery, and a method for controlling the same.

Further, the present disclosure may provide a vehicle capable of improving the life of a lithium ion battery, and a method for controlling the same.

Exemplary embodiments of the present disclosure have been described above. In the exemplary embodiments described above, some components may be implemented as a "module." Here, the term 'module' refers to, but is not limited to, a software and/or hardware component, such as a Field Programmable Gate Array (FPGA) or an Application Specific Integrated Circuit (ASIC), which performs certain tasks. The module may advantageously be configured to reside on the addressable storage medium and configured to execute on one or more processors.

Thus, the module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any of the above described exemplary embodiments. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memory (CD-ROM), a magnetic tape, a floppy disk, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

The invention claimed is:

1. A vehicle comprising:
   a battery;
   a battery sensor configured to sense an output voltage and an output current of the battery; and
   a power management device configured to control charging of the battery based on a state of charge (SoC) of the battery;
   wherein the power management device is configured to:
   calculate an estimated SoC of the battery based on the output current of the battery,
   calculate an actual SoC based on the output of a battery model corresponding to an input of the output voltage and the output current;
   based on an error between the actual SoC and the estimated SoC, activate a power generation control, which controls a generator based on the SoC of the battery, and an idle stop & go (ISG), which turns off an engine during stopping of the vehicle;
   input the output voltage and the output current to the battery model when the estimated SoC of the battery is out of an available range of the battery and calculate a first reference SoC based on an output of the battery model;
   calculate a first increment of the estimated SoC of the battery while charging the battery;
   define the SoC, which is determined when the output voltage of the battery reaches a target voltage and the output current of the battery decreases, as a second reference SoC; and
   calculate a second calculation error based on a difference between a value, which is a difference between the second reference SoC and the first reference SoC, and a second increment of the estimated SoC.

2. The vehicle according to claim 1, wherein the power management device is configured to:
reset the estimated SoC of the battery to the first reference SoC; and
calculate a first calculation error based on a difference between the first reference SoC and the estimated SoC.

3. The vehicle according to claim 1, wherein the power management device is configured to:
calculate the second increment of the estimated SoC of the battery while charging the battery;
define the SoC, which is determined when the output voltage of the battery is higher than the target voltage and the output current of the battery is lower than a reference current, as a third reference SoC; and
calculate a third calculation error based on a difference between a value, which is a difference between the third reference SoC and the second reference SoC, and a third increment of the estimated SoC.

4. The vehicle according to claim 3, wherein the power management device is configured to activate the power generation control and the ISG when the second calculation error is smaller than a predetermined first reference error.

5. The vehicle according to claim 3, wherein the power management device is configured to, when the second calculation error is greater than or equal to a predetermined first reference error, determine whether both the second calculation error and the first calculation error are greater than a second reference error; and
wherein the second reference error is greater than the first reference error.

6. The vehicle according to claim 5, wherein the power management device is configured to, when both the second calculation error and the first calculation error are greater than the second reference error, deactivate the power generation control and the ISG.

7. The vehicle according to claim 3, wherein the power management device is configured to, when the second calculation error is equal to or greater than a predetermined first reference error, calculate a third calculation error rate based on a quotient of the third calculation error divided by a difference between the third reference SoC and the second reference SoC.

8. The vehicle according to claim 7, wherein the power management device is configured to, when the second calculation error is larger than the product of the first increment of the estimated SoC and the third calculation error rate, deactivate the power generation control and activate the ISG.

9. The vehicle according to claim 7, wherein the power management device is configured to, when the second calculation error is less than or equal to the product of the first increment of the estimated SoC and the third calculation error rate, activate the power generation control and the ISG.

10. A method for controlling a vehicle which comprises a battery and a battery sensor to sense an output voltage and an output current of the battery, the method comprising:
calculating an estimated SoC of the battery based on the output current of the battery;
calculating an actual SoC based on the output of a battery model corresponding to an input of the output voltage and the output current;
based on an error between the actual SoC and the estimated SoC, activating a power generation control, which controls a generator based on a SoC of the battery, and an idle stop & go (ISG), which turns off an engine during stopping of the vehicle;
inputting the output voltage and the output current to the battery model when the estimated SoC of the battery is out of an available range of the battery and calculating a first reference SoC based on an output of the battery model;
calculating a first increment of the estimated SoC of the battery while charging the battery;
defining the SoC, which is determined when the output voltage of the battery reaches a target voltage and the output current of the battery decreases, as a second reference SoC; and
calculating a second calculation error based on a difference between a value, which is a difference between the second reference SoC and the first reference SoC, and a second increment of the estimated SoC.

11. The method according to claim 10, wherein the activating of the power generation control and the ISG comprises:
resetting the estimated SoC of the battery to the first reference SoC; and
calculating a first calculation error based on a difference between the first reference SoC and the estimated SoC.

12. The method according to claim 10, wherein the activating of the power generation control and the ISG comprises:
calculating the second increment of the estimated SoC of the battery while charging the battery;
defining the SoC, which is determined when the output voltage of the battery is higher than the target voltage and the output current of the battery is lower than a reference current, as a third reference SoC; and
calculating a third calculation error based on a difference between a value, which is a difference between the third reference SoC and the second reference SoC, and a third increment of the estimated SoC.

13. The method according to claim 12, wherein the activating of the power generation control and the ISG comprises activating the power generation control and the ISG when the second calculation error is smaller than a predetermined first reference error.

14. The method according to claim 12, wherein the activating of the power generation control and the ISG comprises, when the second calculation error is greater than or equal to a predetermined first reference error, determining whether both the second calculation error and the first calculation error are greater than a second reference error; and
wherein the second reference error is greater than the first reference error.

15. The method according to claim 14, wherein the activating of the power generation control and the ISG comprises, when both the second calculation error and the first calculation error are greater than the second reference error, deactivating the power generation control and the ISG.

16. The method according to claim 12, wherein the activating of the power generation control and the ISG comprises, when the second calculation error is equal to or greater than a predetermined first reference error, calculating a third calculation error rate based on a quotient of the third calculation error divided by a difference between the third reference SoC and the second reference SoC.

17. The method according to claim 16, wherein the activating of the power generation control and the ISG comprises, when the second calculation error is larger than the product of the first increment of the estimated SoC and the third calculation error rate, deactivating the power generation control and activating the ISG.

18. The method according to claim 16, wherein the activating of the power generation control and the ISG comprises, when the second calculation error is less than or equal to the product of the first increment of the estimated SoC and the third calculation error rate, activating the power generation control and the ISG.

* * * * *